Sept. 19, 1967 K. DUITSMAN 3,342,397
DIVIDED FOOD SERVICE TRAY
Filed Jan. 30, 1967
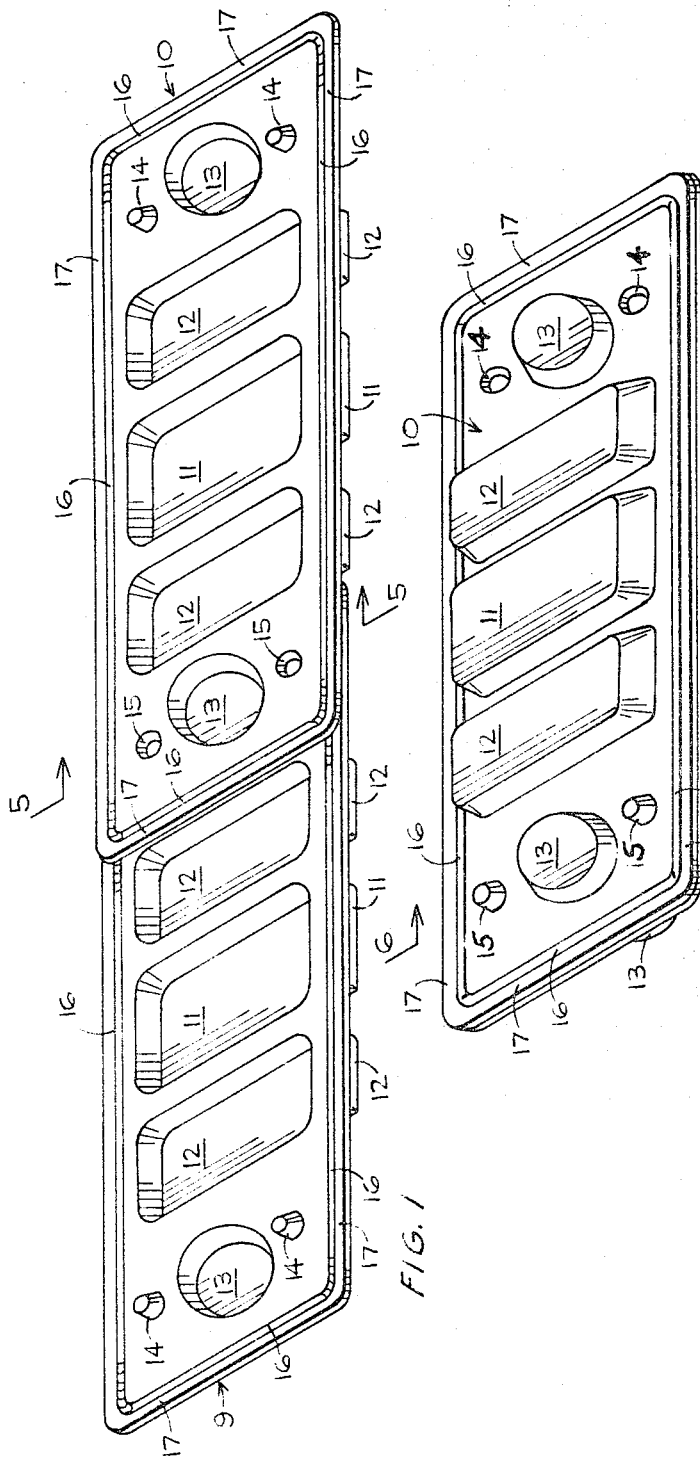
INVENTOR.
KENNETH DUITSMAN

3,342,397
DIVIDED FOOD SERVICE TRAY
Kenneth Duitsman, Washington, Kans. 66968
Filed Jan. 30, 1967, Ser. No. 612,701
5 Claims. (Cl. 229—2.5)

ABSTRACT OF THE DISCLOSURE

Paperboard food service trays provided with means to engage complementary means in an identical tray for nesting the trays when in one position and for forming a covered tray when in a second position.

---

This invention relates to the class of divided paperboard food service trays, and more in particular to a plurality of formations selectively arranged through a plurality of combinations.

The invention residing in a plurality of anchoring members disposed within a divided paperboard food service tray and which anchoring members serve to selectively engage with complementary members provided within a second and identical tray whereby the trays can be detachably secured to each other selectively in various formations through various combinations thereby rendering to both the user and the manufacturer a means which increases the trays utility without materially increasing its initial cost.

Among the objects of achievement provided by my invention, the first being to provide a divided paperboard food service tray selective in use relative to a second and identical tray whereby both trays may be detachably secured in substantially co-extensive and co-planar relation serving to provide a time saving means to the user, as by retaining both service trays within the grasp of one hand while distributing substantially simultaneously a dual meal portion thereon with the use of his free hand, and effecting a dual serving to two individual persons.

The second object of my invention being to combine in detachable engagement two selective and identical food service trays which may be overlapped and in opposed relation relative to each other defining a cellular container therebetween, whereby serving the user to encase his food refuse therein and substantially obviating the saturation of the air with the food odors which in the past has been an attraction to insects, and furthermore substantially obviating the littering of public grounds.

A third object of my invention residing in the means to detachably secure a plurality of food service trays in overlapped and complementary telescopic relation relative to each other, serving to protect their sanitary condition, whereby the open face of a depending food service tray is substantially sealed to the lower face of a superposed tray. Furthermore the stack defined by the plurality of food service trays in superposed relation facilitates substantially their transportation as well as to their storage until a selective number are required for use.

The invention itself, however, may be best understood by reference to the following description as when taken in accordance with the following and accompanying drawings, in which like numerals are employed to indicate identical components, wherein:

FIGURE 1 is a view in perspective of an embodiment of my invention which illustrates a first selective formation rendered by a first combination of a pair of identical food service trays.

FIGURE 2 is a second view in perspective which illustrates a second selective formation rendered by a second combination between a selective pair of identical trays.

FIGURE 3 is a view in transverse section taken substantially along the line 5—5 of FIGURE 1, and within this view it will be readily apparent how a plurality of identical trays may be interfitted in complementary and superposed relation to define a stack therewith.

FIGURE 4 is a second view in transverse section taken along the line 6—6 of FIGURE 2, and within this view it will be readily apparent how a cellular container can be formed by a pair of identical food service trays when combined in overlapping and opposed relation.

Referring now in a descriptive manner to the embodiment of the invention, in which the numerals 9 and 10 indicate generally a pair of identical panels being substantially rectangular in form and substantially elongated, and which panels may be composed of a vinyl plastic material, but preference is had to paperboard which at the present time is more economical in cost.

The respective and identical panels 9 and 10 are each provided with a circumventing flange 17 which is defined by the parallel end and side marginal edges thereof, and disposed parallel therewith, therein is provided an endless groove or depending rib 16 which serves to substantially reinforce the flanges flexure.

Furthermore, and disposed within the perimetric confines of the rib 16 therein is provided centrally and transversely the central and longitudinal axis of each respective panel, a substantially rectangular receptacle 11 having inwardly inclined side and end walls which serve to complement an inner or overfit selectively, with a second and identical receptacle 11, as when in telescopic relation. The receptacle 11 may complement the seating therein a meal portion comprising either fish or meat, and spaced equally and parallel from its opposite elongated sides, therein is provided a pair of identical rectangular receptacles 12 which are uniform to the receptacle 11 exclusive of their width, and which may complement the seating therein selectively a vegetable and a salad or the like, and spaced from the outboard sides of each receptacle 12 and centrally aligned therewith, therein is provided a pair of frusto-conical receptacles 13 which may serve selectively to seat therein a paper drinking cup or the like.

The hereinbefore described positioning of each respective receptacle as disposed within each respective panel 9 and 10 provides a basic means whereby they can be assembled in a plurality of arrangements through various combinations, and which makes it possible for my invention to achieve its intended purposes, and which combinations are exemplified through the diversified FIGURES 1 through 4 inclusive of the accompanying drawing, and as follows:

Disposed within a selective end of a selective panel 9 or 10 and within the perimetric confines of the rib 16, and equally spaced from the radial periphery of a respective receptacle of the first said pair of frusto-conical receptacles 13 and in opposed relation therewith, and centrally aligned on its diametric axis which transverses the central and longitudinal axis of a selective blank or tray 9 and 10 therein is provided a pair of identical frusto-conical members 15 which serve alternately as both sockets and as ferrules, with their related definitions being defined selectively through the various combinations served by the panels or trays 9 and 10, which has been herein described.

The panels or trays 9 and 10 further more comprise in addition to the afore-mentioned receptacles, and the frusto-conical members 15, a respective pair of inverted frusto-conical members 14 which are uniform in size to the frusto-conical members 15. The inverted frusto-conical members 14 superpose the open face of each respective panel or tray 9 and 10 and which are spaced in opposed relation at the opposite sides of the second remaining frusto-conical receptacle 13, and which spacing conforms uniformly to the established spacing set forth of the frusto-conical members 15 with the first selective frusto-conical receptacle 13.

Now best referring to FIGURE 1 within the drawing, therein is illustrated a first and second respective pair of identical panels or trays 9 and 10 which are assembled in substantially co-extensive and co-planar relation and each includes at least one frusto-conical receptacle 13 and a respective pair of frusto-conical members 15 which complement each other telescopically and yieldingly when press fitted together and which serve to obviate the pivotal movement radially and relative to each other and serve as a supplemental means to the pivoting arrangement served between a respective pair of frusto-conical receptacles 13 whereby the composite disposed within the panels or trays 9 and 10 provides a means whereby they can be grasped medially by one hand of the user, and it becomes readily apparent that a dual serving of food can be substantially simultaneously served, or a meal portion of a greater capacity can be served to one individual person simultaneously which ordinarily would require two individual servings. Now having described one combination readily rendered by my invention, I will now describe the second combination, which is as follows:

Referring to FIGURES 2 and 4 within the drawing therein is shown a combination of identical panels or trays 9 and 10 which are arranged in over-lapped and opposed relation and when detachably secured one relative to the other they serve to provide a substantially sealed cellular container in which food refuse can be readily stored, whereby obviating the egress of inviting food odors which ordinarily would attract insects, and furthermore the container will encourage users to store their food refuse more readily for future disposal which will substantially obviate the littering of public grounds, the means provided within the container to detachably secure a pair of identical panels or trays 9 and 10 resides in a first and second said respective pairs of inverted frusto-conical members 14 which supplement the first and second said respective pairs of frusto-conical members 15 and which have been hereinbefore described whereby a first respective pair of inverted frusto-conical members 14 and an associated respective pair of frusto-conical members 15 disposed within a first panel 9 will complement telescopically and securingly with a respective pair of frusto-conical members 15 and a respective pair of inverted frusto-conical members 14 within a second and identical panel 10 respectively and which fastening means serve to bring the complementary flanges 17 into contiguous relation. Now having described the second combination rendered by my invention, I will now describe a third combination, which is as follows:

Referring to FIGURE 3 within the drawing and though this view as shown is a transverse section taken from FIGURE 1 it will become apparent from the description that the identical panels or trays 9 and 10 complement each other both telescopically and yieldingly securingly whereby a plurality of identical trays may be assembled into a stack of substantial height serving to facilitate their transportation and their storage until a selective number are required for use, and furthermore the assembled stack serves to obviate the contamination of the open face of a food service tray within a stack, exclusive of the top tray, as by the open face of a first tray being sealed to the lower face of an identical panel when in inter-fitted and complementary relation therewith.

Having now fully described my invention, I claim:

1. The combination of a rectangular and divided food service tray formed within a suitable paperboard blank having a top panel, a lateral flange circumventing the said panel, a rib disposed within the said flange, a plurality of at least five receptacles having a uniform depth, disposed within the said panel and depending therefrom, said receptacles spaced within the perimetric confines of the said rib, said receptacles having their centers transversed by the central and longitudinal axis of the said panel, two of the said receptacles being frusto-conical in shape and identical relative to each other, and the remaining receptacles being rectangular of which each is provided with inwardly inclined side and end walls each having a uniform taper and uniform respectively to the side and end walls of the other respective receptacles, one of the said rectangular receptacles provided with a greater width relative to the width of the other rectangular receptacles, which are identical in size, said identical receptacles spaced equally and in opposed relation from the opposite elongated sides of the larger receptacle, which is centered transversely the said panel, said frusto-conical receptacles spaced equally and in opposed relation from the outboard and elongated sides of the identical receptacles, said receptacles defining a divided tray with the said panel, of a second identical tray positioned in co-extensive alignment with the first said tray and in co-planar relation therewith, means to pivotly secure said trays to prevent lateral disengagement relative to each other, anchoring means to obviate the said pivotal means to prevent radial movement of said trays relative to each other, a second combination of a first and second said respective pair of identical divided food service trays, said second tray aligned in opposed and superposed arrangement with the first said tray to provide a cellular container therebetween, means to detachably secure said trays in sealing engagement providing to obviate the ingress of air therein, a third combination of a first and a plurality of divided and identical food service trays aligned in telescopic and complementary relation one relative to another defining a stack therewith, air sealing means to obviate the contamination of the pre-sanitary condition of said stack of trays, exclusive of the open face of the top tray therewith.

2. As claimed in claim 1, whereby the means to pivotally secure the said trays in co-extensive and co-planar relation comprises a selective frusto-conical receptacle within a first tray aligned in telescopic arrangement with a second selective frusto-conical receptacle within a second and identical tray.

3. As claimed in claim 1, whereby the means to anchor the said trays to obviate pivotal movement therebetween through the first said means, comprises a first respective pair of frusto-conical members disposed within a first tray which seat telescopically a second respective pair of frusto-conical members in a second and overlapping tray.

4. As claimed in claim 1, whereby the means to detachably secure and seal a respective pair of identical food service trays in opposed and superposed relation one relative to the other comprises a first and second respective pair of inverted frusto-conical members disposed in opposed relation and equally spaced from the remaining said frusto-conical receptacle within a first and second said respective pair of identical food service trays, said respective pair of inverted frusto-conical members and said respective pair of frusto-conical members within a first selective tray aligned in telescopic and detachable engagement with a said respective pair of frusto-conical members and a respective pair of inverted frusto-conical members respectively within a second and identical tray.

5. As claimed in claim 1, whereby the means to obviate the contamination of the open faces of a plurality of identical food service trays disposed within a stack exclusive of the top tray, comprises the open face of the divided arrangement within a selective tray to be sealed by the lower face of a complementary division provided within a second and identical tray telescopically secured therewith.

References Cited

UNITED STATES PATENTS

| | | | |
|---|---|---|---|
| 3,131,846 | 5/1964 | Whiteford | 229—29 |
| 3,191,796 | 6/1965 | Schwartz et al. | 220—23.6 |
| 3,195,770 | 7/1965 | Robertson | 206—65 |

FOREIGN PATENTS 1,278,149   10/1961   France.

JOSEPH R. LECLAIR, *Primary Examiner.*

D. M. BOCKENEK, *Assistant Examiner.*